United States Patent [19]

Brown et al.

[11] 4,418,453

[45] Dec. 6, 1983

[54] HEATING APPARATUS FOR SHRINK TUBING

[75] Inventors: Christopher K. Brown, Camp Hill; Donald A. Wion, Harrisburg, both of Pa.

[73] Assignee: AMP Incorporated, Harrisburg, Pa.

[21] Appl. No.: 239,967

[22] Filed: Mar. 3, 1981

[51] Int. Cl.³ .......................... B27F 9/00; H01R 43/00
[52] U.S. Cl. ..................................... 29/33 M; 34/105; 29/447; 29/742; 29/859
[58] Field of Search ................. 29/447, 859, 742, 745, 29/747, 748, 753, 33 M; 34/21, 105; 264/342 R

[56] References Cited

U.S. PATENT DOCUMENTS 3,812,568  5/1974  Nemeth et al. ................... 29/203 D
4,050,888  9/1977  Pfister et al. ...................... 34/105 X

FOREIGN PATENT DOCUMENTS

342814  3/1967  Switzerland ................... 264/342 R

Primary Examiner—Z. R. Bilinsky
Attorney, Agent, or Firm—F. Brice Faller

[57] ABSTRACT

Apparatus comprises a heater which introduces hot air into an elongate duct via a tube to an aperture midway between the open ends of the duct. The duct has parallel slots in opposite walls thereof which extend between said ends in the plane of a conveyor which grips wire leads and transports them laterally so terminated ends lie in the duct. Heat shrink tubing prepositioned on the end of lead may be positioned to protrude from the slot so not exposed to hot air in the duct which prevents shrinkage of tubing over the terminated end.

3 Claims, 21 Drawing Figures

HEATING APPARATUS FOR SHRINK TUBING

BACKGROUND OF THE INVENTION

The present invention relates to a hot air process heater for applying heat shrinkable tubing to a wire lead, and particularly to a slotted wall duct type heater for use with a conveyor which transports leads laterally.

U.S. Pat. No. 3,812,568 discloses a hot air duct type heater having air supply plenums on either side of a passage through which a terminated lead having a section of shrink tubing positioned thereon is transported laterally. The plenums each have a plurality of apertures which admit air to the passage to shrink the section onto the lead. The entire tubing section is exposed to heat and thus must be positioned on the terminal with no more overlap than necessary to compensate for longitudinal shrinking, or else the section of tubing would shrink over the end of the terminal which could preclude mating with another terminal.

Other heaters used for shrinking shrink tubing utilize lamps or other radiant elements, which provide uniform heat but offer the disadvantage of overheating the product if it is not moved through quickly. Further, if a section of tubing becomes lodged on a radiant element, it could be damaged or result in combustion.

It would be desirable to provide a heating apparatus which had the capability to heat the shrink tubing over only part of its length as positioned on the terminated end of a wire lead. This would permit placing a section of tubing on the terminal with more overlap than necessary to compensate for longitudinal shrinkage without shrinking the additional overlap onto the end of the terminal. Thus a terminated lead could be insulated with shrink tubing having sufficient overlap to preclude short circuiting a live lead, but still readily permit termination. In addition to the safety factor provided by having tubing extend beyond the terminal, if the tubing is not shrunk around the mating portion of a spring action terminal the resiliency is not altered and the terminal may be mated more easily.

SUMMARY OF THE INVENTION

The present invention has the capability of shrinking heat shrink tubing selectively over the length of a section positioned on the terminated end of a wire lead. This is accomplished by utilizing a fluid flow phenomenon to contain hot air within a duct having slotted walls through which the tubing section is transported laterally on the end of a lead. A single hot air source provides hot air through a tube to an aperture in the middle of the duct and hot air flows out the ends of the duct slots. Thus any portion of shrink tubing extending through the slot outside of the duct is not heated and does not shrink. An additional advantage of the invention is that a rubber conveyor adjacent to the duct which transports wires therethrough is not affected by heat. A further advantage is that air temperature remains fairly constant throughout the duct since air and heat are not dissipated in significant amounts through slots in the sidewalls. Thus shrinkage is achieved with controlled time and temperature and the product is not exposed to extreme heat.

These and other advantages of the invention will be apparent to one skilled in the art from the description and drawings which follow.

DETAILED DESCRIPTION OF THE PREFERRED EMBODIMENT

In the description which follows, the operation of the system as a whole will be described before detailing the structure and operation of the component apparatus.

Figure 1:
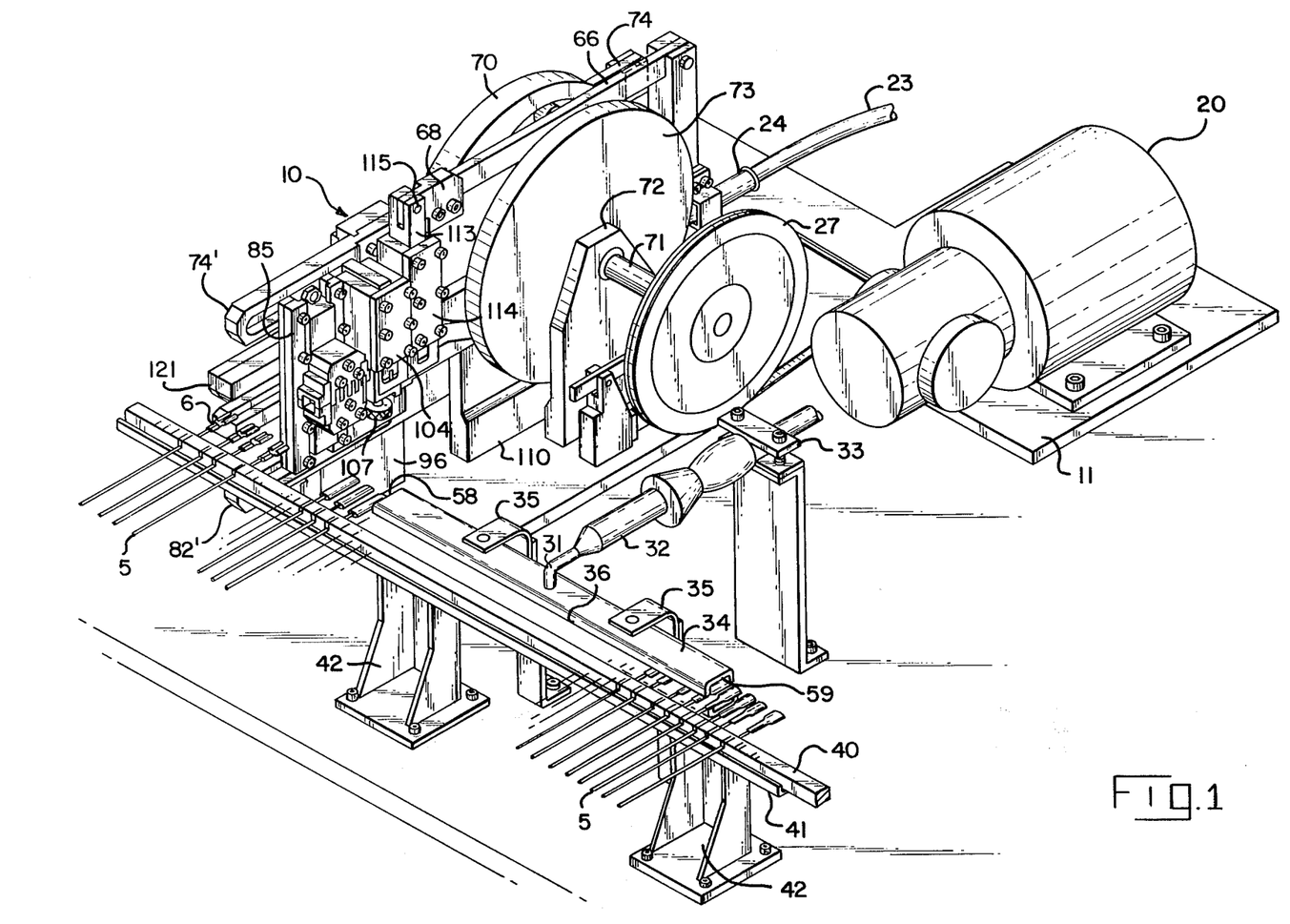
FIG. 1 is a perspective of the tubing applicator and heating apparatus.

FIG. 1 is a perspective of the apparatus in bench form, which includes a tubing applicator 10 and heater 32 which introduces hot air through tube 31 into duct 34 for shrinking tubing sections onto the terminated ends of wire leads. Wire leads 5 are manually placed in wire receiving slots in conveyor 40, which carries the leads past applicator 10 where it stops to have shrink tubing positioned on the terminated end before transporting the leads laterally through hot air duct 34 to shrink the tubing. The belt is resilient material such as rubber having wire receiving slots of the type disclosed in U.S. Pat. No. 3,804,603 which is hereby incorporated by reference.

Figure 2:
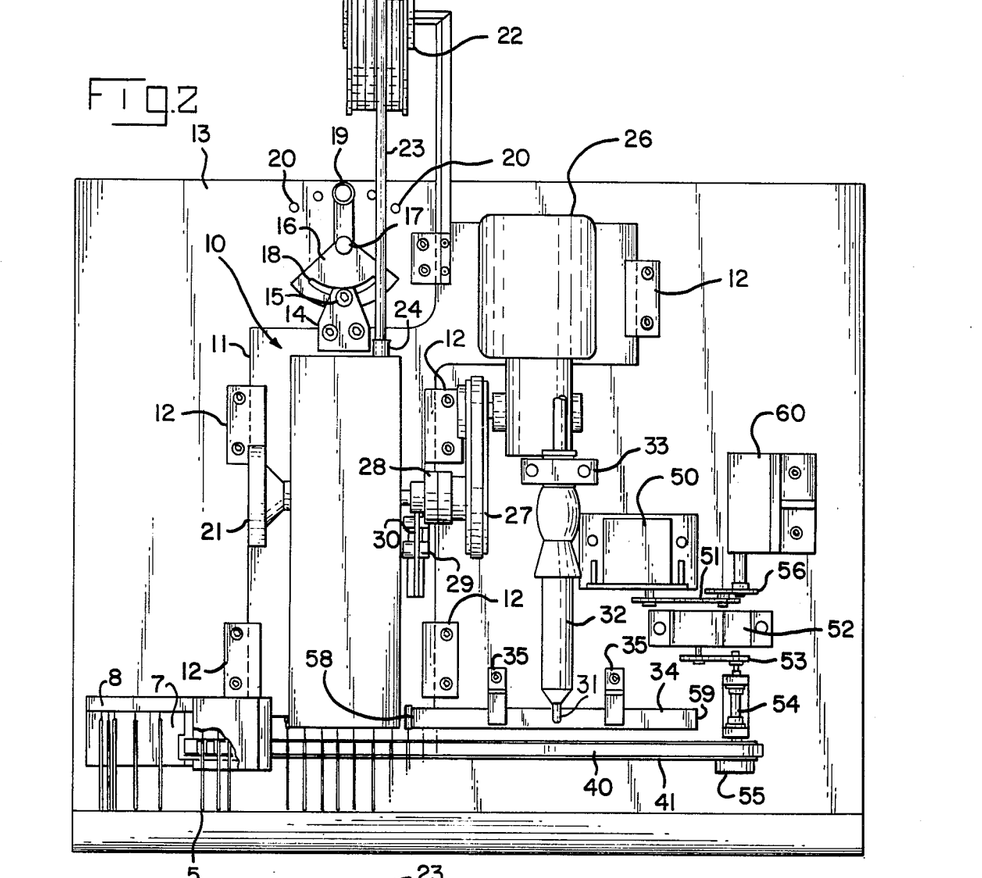
FIG. 2 is a plan view of the tubing applicator and heating apparatus.

FIG. 2 is a plan view of the apparatus, which particularly shows drive means for various components. Gear motor 26 drives belt 27 which drives the applicator 10 through clutch 28. The clutch 28 is activated by solenoid 29 and clutch release bar 30. The applicator 10 may also be cycled manually be handwheel 21. The applicator 10, motor 26, and associated drive linkage are mounted to applicator base 11 which is in turn mounted to base 13 by gibs 12. The gibs 12 permit adjusting the position of the applicator 10 relative to belt 40, so that shrink tubing may be positioned as desired relative to the terminals on the wire leads. The leads are positioned as desired relative to the conveyor 40 by positioning the leads on the surface 7 so that the terminated end is against fence 8, as described in U.S. Pat. No. 3,804,603. Tube depth adjustment cam 16 provides for fine adjustment of the applicator position. The cam 16 is pivoted about pivot screw 17 so that pin 15, which is fixed relative to applicator 10 by guide block 14, rides through arcuate slot 18. Slot 18 is of variable radius so that applicator base 11 thus moves relative to belt 40. Spring plunger 19 on cam 16 locks into any of holes 20 in base 13 to fix the position of the base 11. Shrink tubing 23 is drawn into tubing feed tube 24 on applicator 10 from reel 22 mounted on base 13.

Referring still to FIG. 2, belt 40 is situated to transport leads with tubing sections on the terminated ends thereof from applicator 10 laterally with the ends passing through duct 34, which is mounted to base 13 by duct supports 35. Hot air is supplied to duct 34 through tube 31 by heater 32, which is mounted to base 13 by heater support 33. Motor 50 drives belt 40 through chain 51, indexer 52, chain 53, drive shaft 54, and belt drive sprocket 55. Chains 51 and 53 are borne by sprockets and shafts in usual fashion, with chain 51 also actuating switch 60 through chain 56. The switch 60 determines when the solenoid 29 actuating the clutch 28 on the terminal applicator 10 is engaged, as well as determining the dwell of the solenoid. The belt is operated in a continuous stepping fashion so that it stops for wiring loading and application of shrink tubing. A terminal applicator may also be provided adjacent to the path of the belt as disclosed in U.S. Pat. No. 3,804,603 between the wire loading station and the tubing applicator, with another switch provided to determine when termination occurs.

Figure 3:
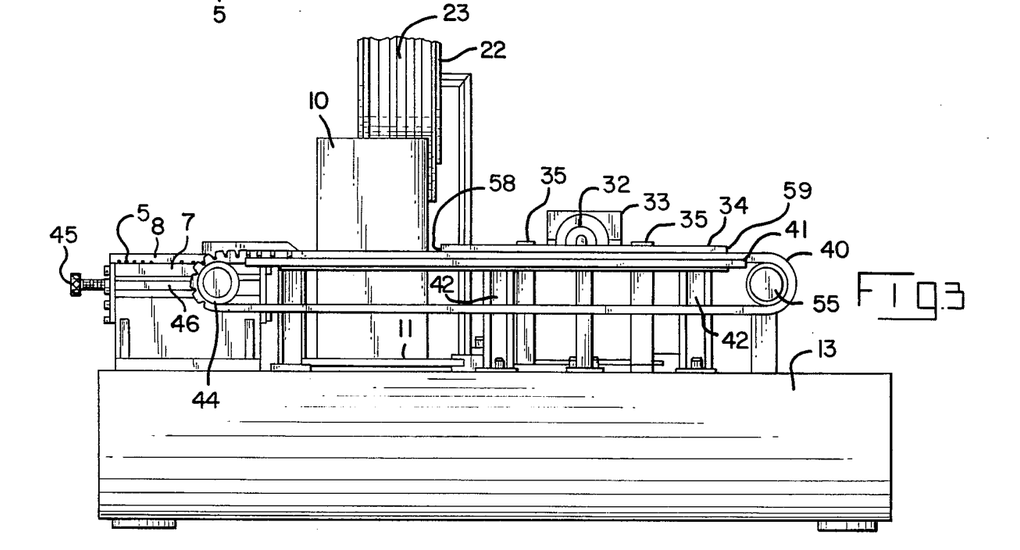
FIG. 3 is an elevation of the tubing applicator and heating apparatus.

FIG. 3 is an elevation of the apparatus showing the drive sprocket 55, conveyor belt 40, belt guide track 41, and idler sprocket 44. Belt tension is controlled by adjustment screw 45, which moves sprocket slide 46 to which idler sprocket 44 is mounted.

Figure 4A:
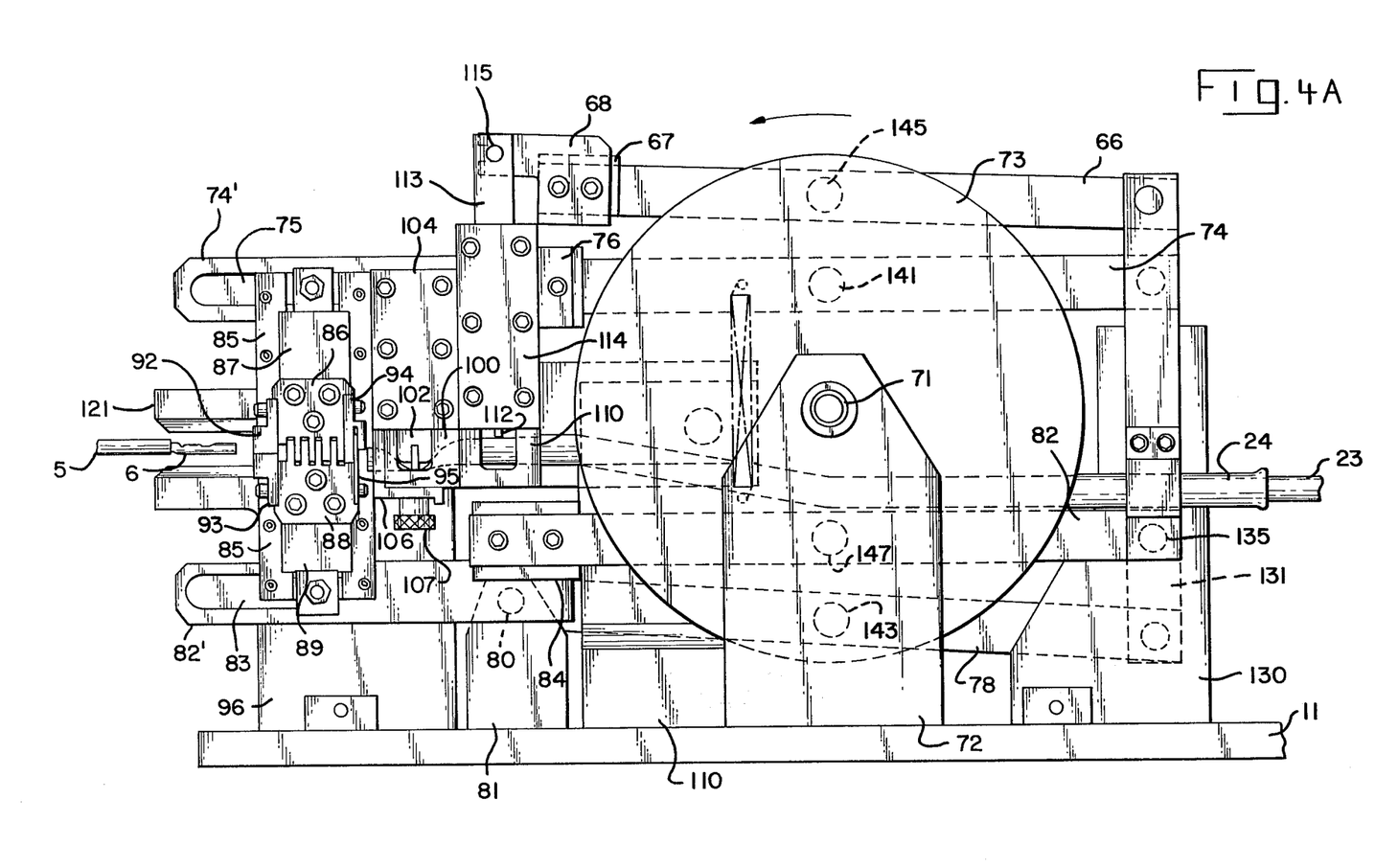
FIG. 4A et seq are side views of the applicator showing sequential steps in the operation.

FIG. 4A is an elevation of the tubing applicator 10, which draws tubing 23 into tubing feed tube 24, cuts off a section of tubing, and places it on the terminated end of lead 5. The mechanical motions necessary to accomplish these operations are effected in part by upper jaw lever 74, lower jaw lever 82, stationary clamp lever 66, and take up lever 78. Each lever is pivotably mounted at one end in lever mounting block 130 as will be more readily apparent in FIG. 10. Vertical motion is imparted to components at the other end of each lever by means of cam followers 141, 143, 145, and 147 which ride in grooves in main cam 70 (shown in FIGS. 5, 9, and 13). The main cam is carried on cam shaft 71 behind advance cam 73, which acts on advance slide 127 (FIGS. 8 and 11) to impart horizontal motion to the tubing advance plate 85 and tubing feed block 100. The cam shaft 71 is journaled in supports 72, 72' and rotates counterclockwise as viewed in FIGS. 4A to 4D. FIG. 4A depicts the 0 degree position; jaws 86, 88 contain a section of shrink tubing which has been sheared by shear blade 95 cooperating with shear plate 94. Upper jaw 86 is bolted to upper jaw slide 87 while lower jaw 88 is bolted to lower jaw slide 89; the slides 86, 87 are both slideably mounted for vertical movement in tubing advance plate 85. Vertical motion is imparted to the slides 87, 89 by the action of levers 74', 82' which are extensions of levers 74, 82 respectively; lever 74' is bolted to lever 74 through adjustment plate 76 while lever 82' is bolted to lever 82 through adjustment plate 84. This appears in cross section in FIG. 8.

Figure 6:
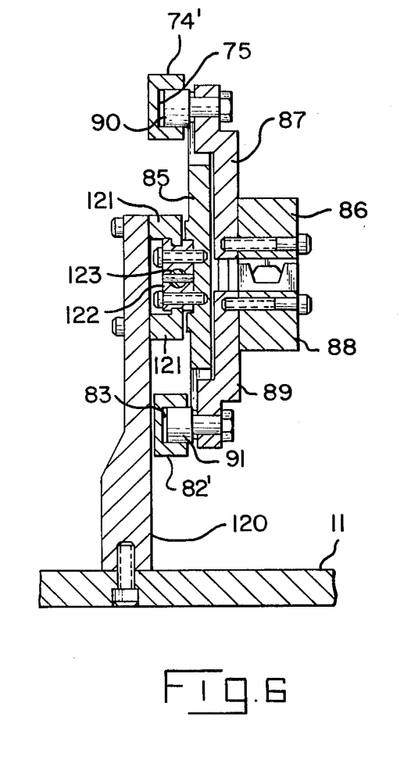
FIG. 6 is a section of the jaws, taken along line 6—6 of FIG. 5.
Figures 10, 15A, 15B:
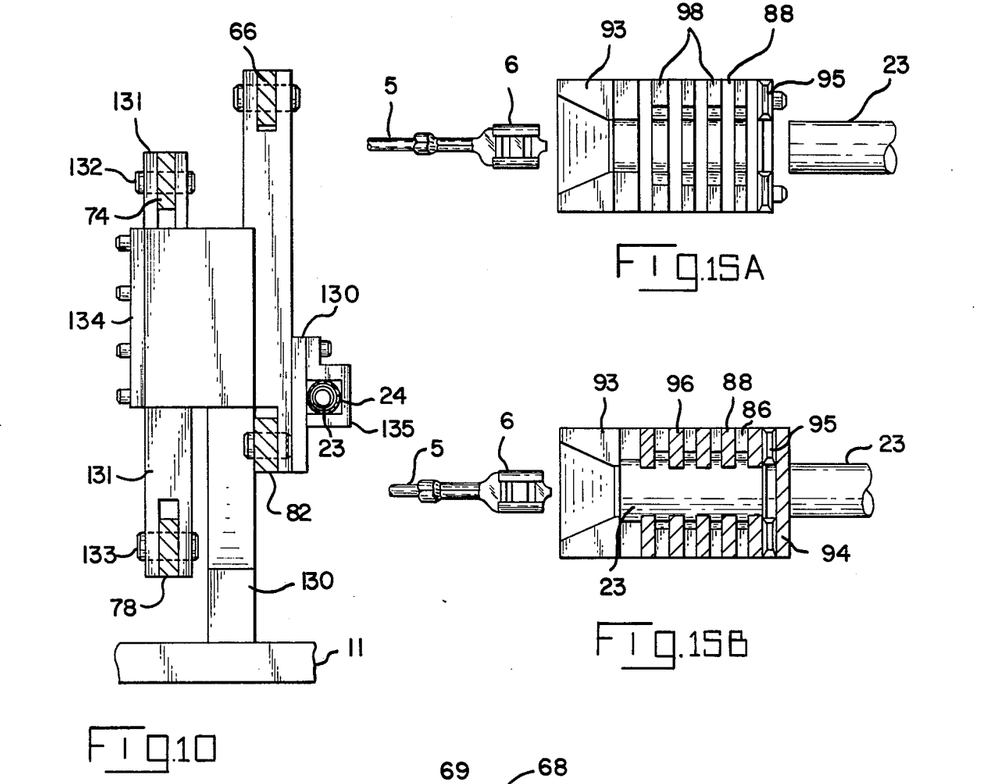
FIG. 10 is a section showing the lever mounting block, taken along line 10—10 of FIG. 5.
FIG. 15A is a plan view of the lower jaw.
FIG. 15B is a section view taken through the upper jaw as engaged to the lower jaw with a section of tubing.

FIG. 6 shows the jaw assembly in the position of FIG. 4A in cross section. The slides 87, 89 carry rollers 90, 91 which ride in channels 75, 83 in levers 74', 82' respectively. This permits the slides to move with tubing advance plate 85, which is bolted to tubing advance block 122. The advance block 122 is slideably mounted in slide gibs 121 which are bolted to tubing jaw mount 120 which is bolted to applicator base 11. Note that jaws 86, 88 sandwich the tubing section contained therebetween into an oval to facilitate placement on a flat terminal. FIG. 15A shows the lower jaw 88 in plan; teeth 98 mesh with teeth 96 of the upper jaw 86 to enclose the tubing as shown in FIG. 15B. Note that the tubing is compressed so that the inside diameter of the tubing section circumscribes the inner mouth of leadin 93; this feature prevents the terminal 6 from interfering with the tubing section as the jaws move forward to place the tubing on the terminal.

Figure 7:
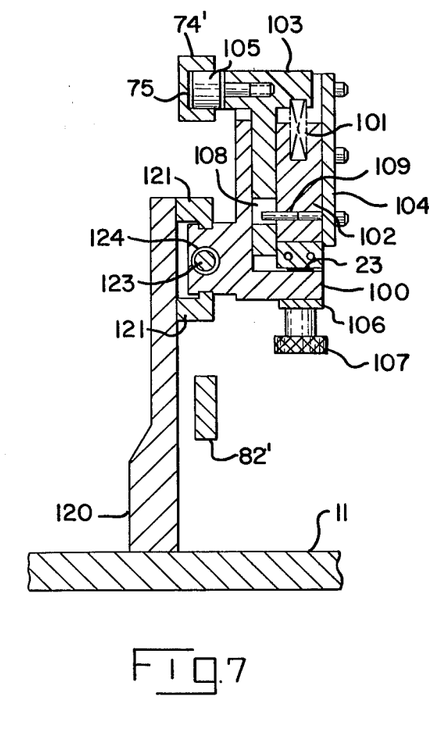
FIG. 7 is a section of the feed clamp, taken along line 7—7 of FIG. 5.

Referring again to FIG. 4A, the first or feed clamp 102 is slideably mounted in tubing feed block 100 and is retained therein by retaining plate 104 which is bolted to the feed block 100. Shaping plate 106 is held to the bottom of the feed block 100 by retaining screw 107 and serves to position the tubing for reception by jaws 86, 88 as will be described. FIG. 7 shows the feed clamp assembly in the position of FIG. 4A in cross section. Feed clamp 102 is carried by feed clamp slide 103 by means of slot 108 and pin 109, which effects lost motion between the slide 103 and clamp 107; spring 101 is positioned between slide 103 and clamp 102 so that the clamp may bear resiliently against the tubing without damaging it. Slide 103 carries a roller 105 which rides in channel 75 in lever 74' to permit motion along the same path as upper jaw slide 87. The feed block 100 is slideably mounted in gibs 121 which are fixed to tubing jaw mount 120. Advance shaft 123 passes through bore 124 in the feed block 100 to impart motion to advance block 122 as will be more apparent with reference to FIGS. 6 and 11.

Figure 8:
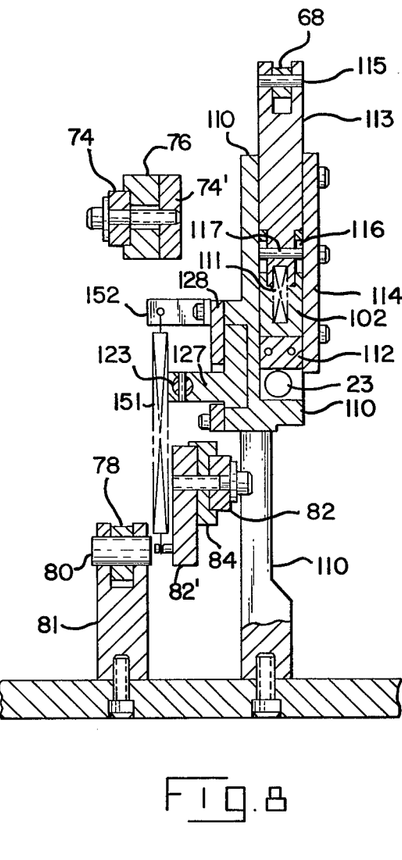
FIG. 8 is a section of the stationary clamp, taken along line 8—8 of FIG. 5.
Figure 9:
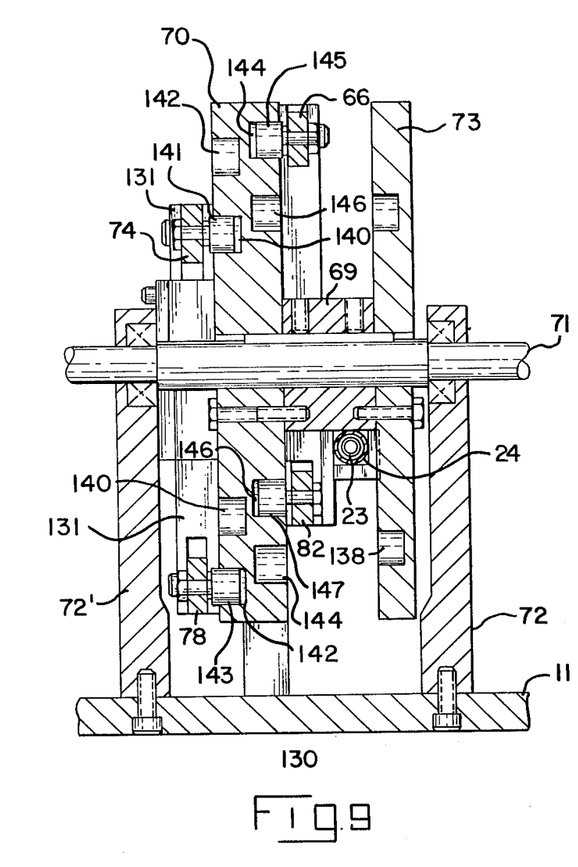
FIG. 9 is a section of the cams, taken along line 9—9 of FIG. 5.

Looking again at FIG. 4A, the second or stationary clamp 112 is slideably mounted in mount 110, a large machined piece which serves several mounting functions in the apparatus. The clamp 112 is carried by stationary clamp slide 113 which is retained in mount 110 by retainer 114 and carried at the top by pin 115 in clevis 68. Clevis 68 is in effect an extension of stationary clamp lever 66 and is adjustably attached thereto through adjustment plate 67. FIG. 8 is a cross section through the stationary clamp in the position of FIG. 4A. Lost motion is effected by pin 117 fixed in slide 113 which travels in slot 116 in clamp 112. Spring 111 assures resilience between the slide 113 and the clamp 112 to prevent damage to tubing 23 when the clamp descends. Mount 110 also carries advance slide 127 which is retained by cover 128. Spring clip 152 carries spring 151 which is attached at the other end to lower jaw lever 82' to take up any play. Also evident in FIG. 8 is the cross section of pivot mount 81 which carries pivot pin 80 about which takeup lever 78 pivots.

Figure 4B:
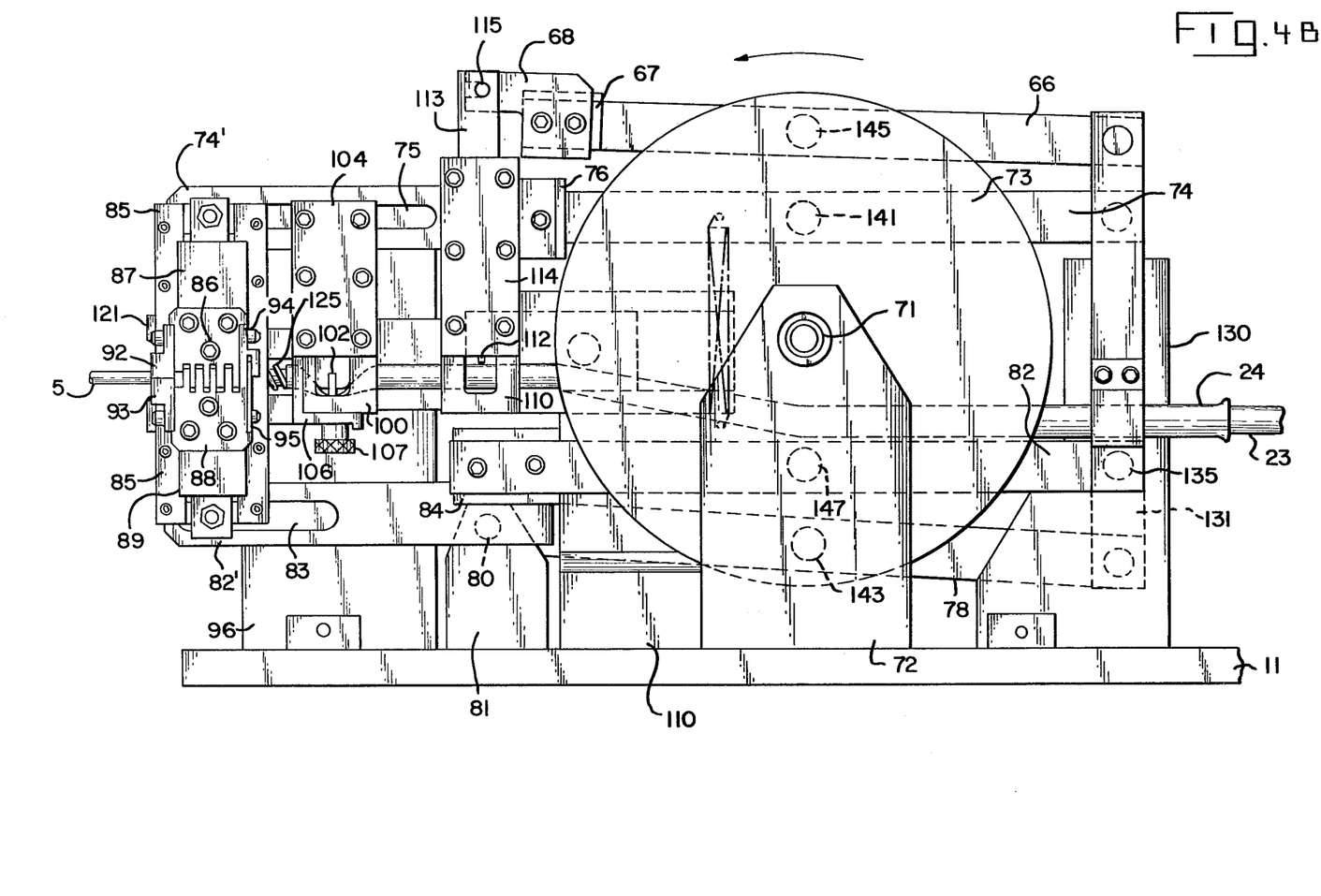
Figure 4C:
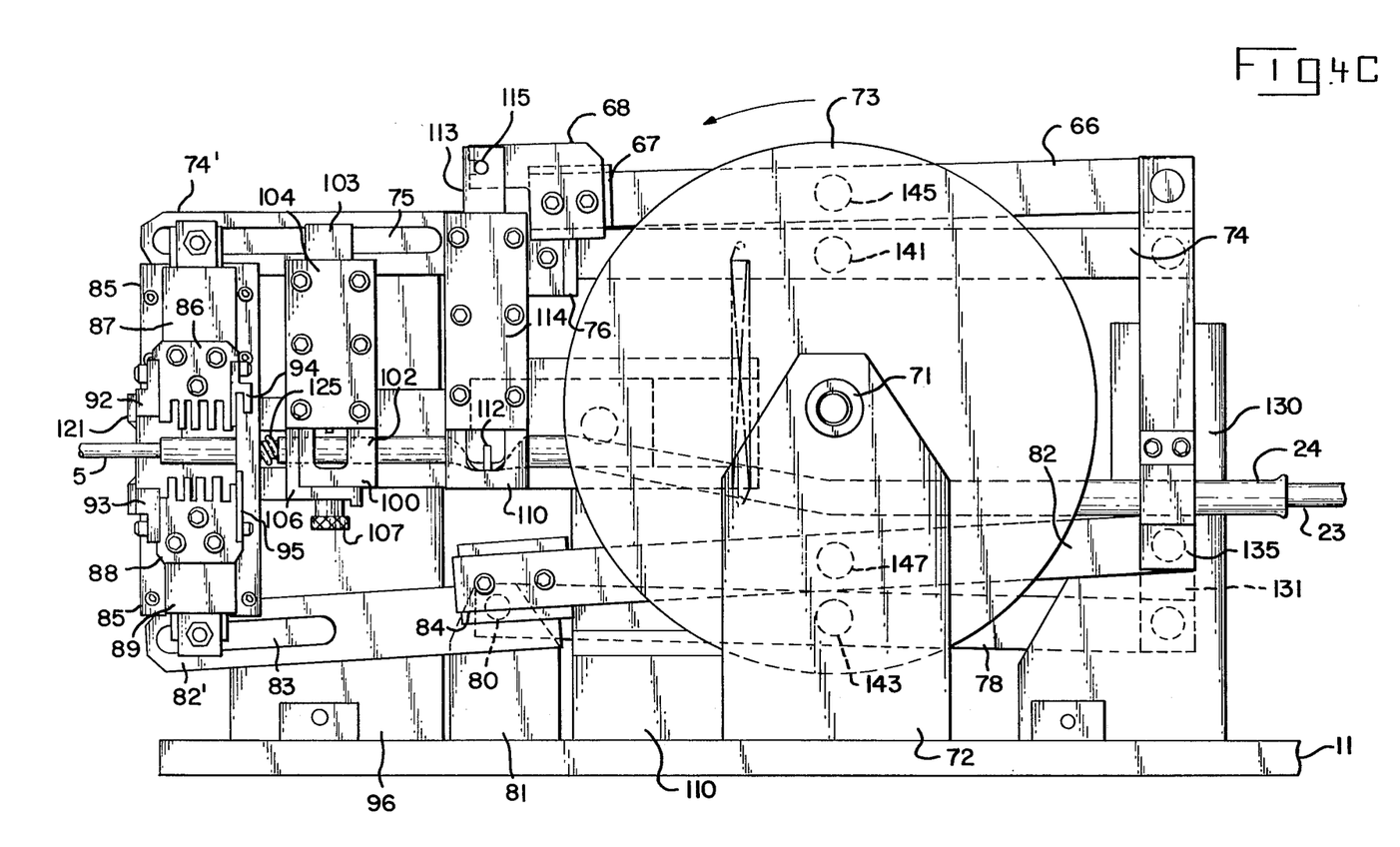
Figure 4D:
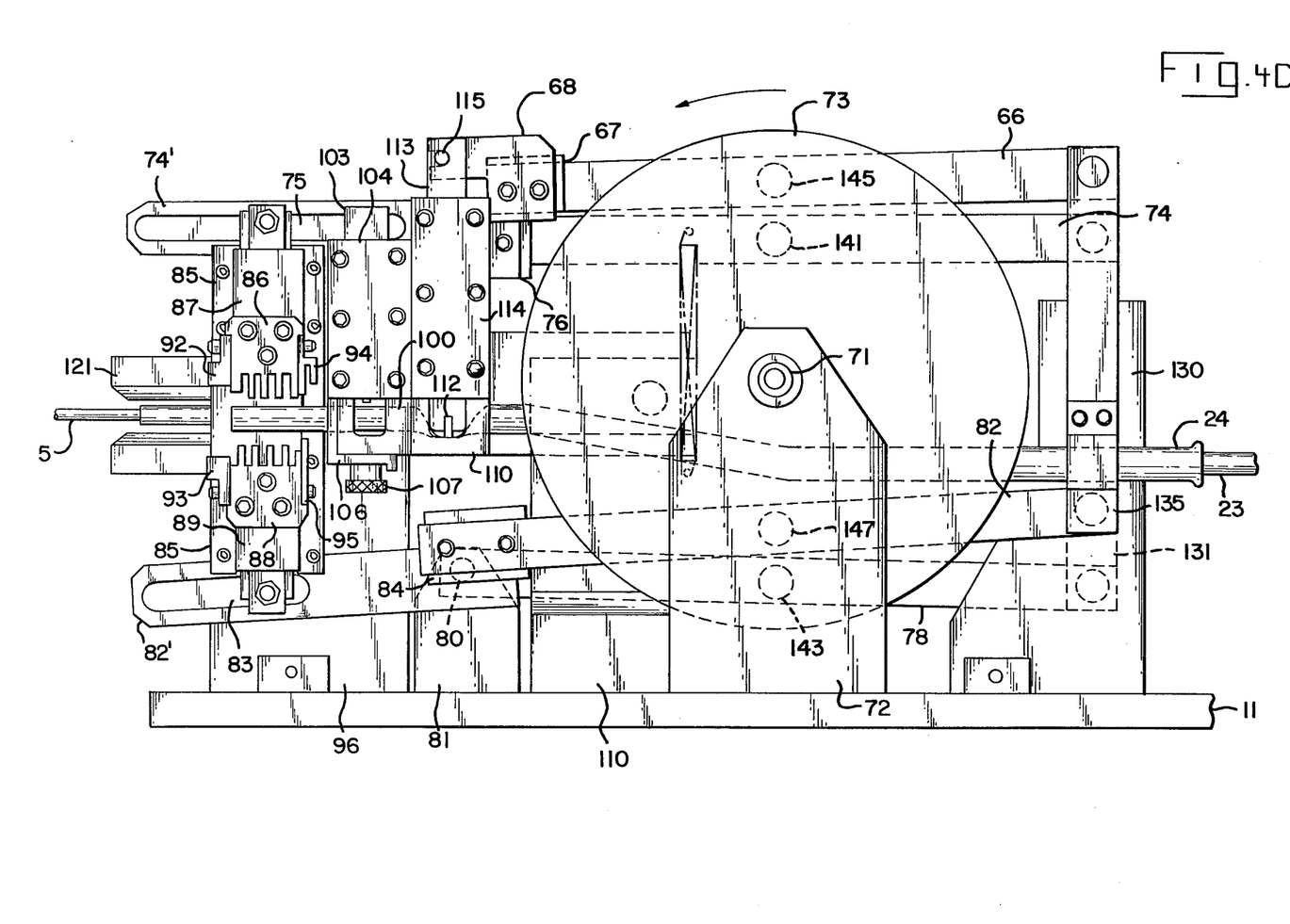
Figure 5:
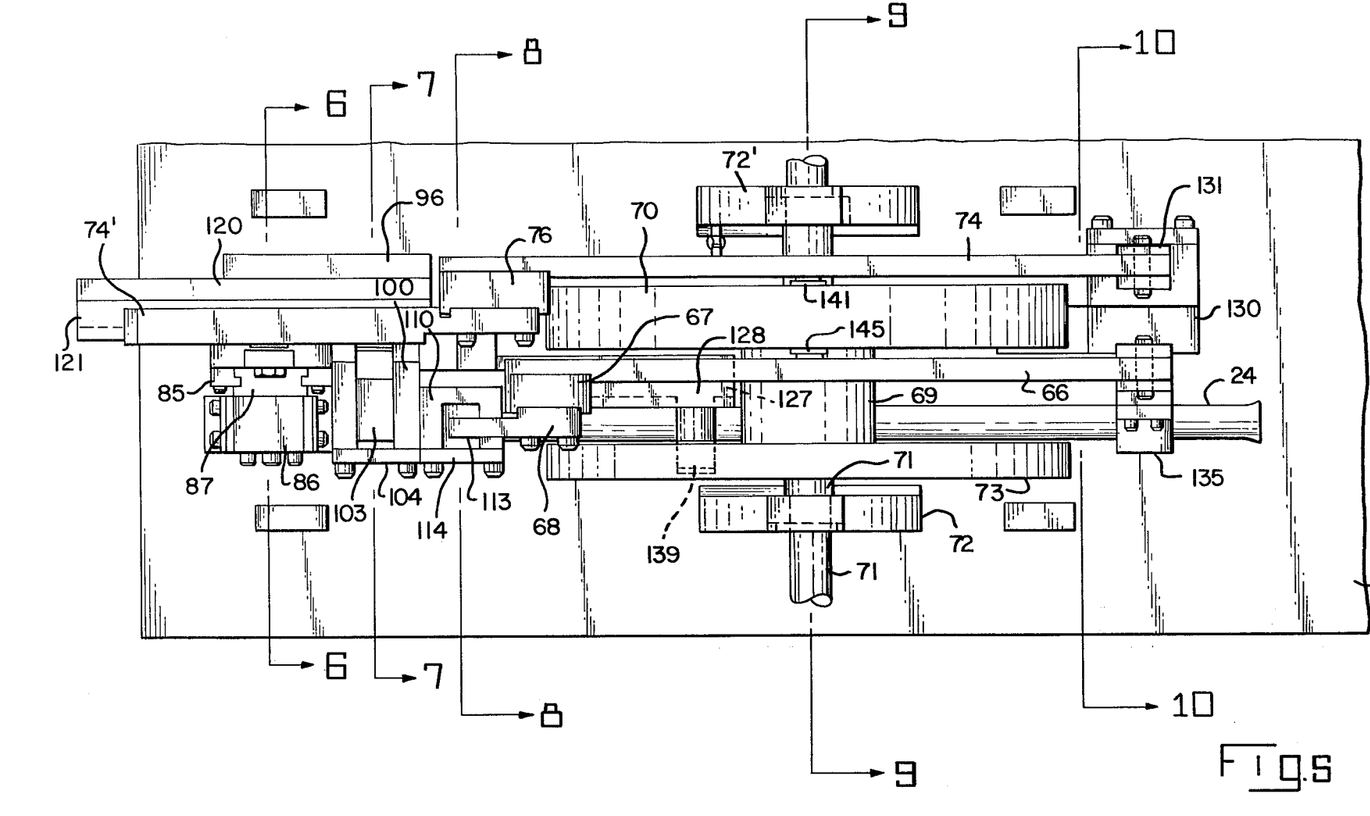
FIG. 5 is a plan view of the applicator.

FIG. 5 is a top view of the apparatus in the position of FIG. 4A. Here the main cam 70 and advance cam 73 are apparent; the cams are bolted to hub 69 which is keyed on cam shaft 71. This is shown cross sectionally in FIG. 9; here the cam grooves and followers are apparent. Groove 140 and follower 141 control the vertical movement of the upper jaw 86 and feed clamp 102, while groove 142 and follower 143 control the movement of take up lever 78, which (through linkage apparent in FIGS. 4A to 4D and FIG. 10) assures that the upper jaw 86 and clamp 102 remain level relative to each other and move down linearly rather than arcuately. Groove 144 and follower 145 control the vertical movement of the stationary clamp 112 (FIG. 4A), while groove 146 and follower 147 control the vertical movement of lower jaw 88 (FIG. 4A). Groove 138 in advance cam 73 carries follower 139 visible only in FIGS. 4A to 4D. This rides in the forward portion of groove 138 to effect horizontal movement of the tubing advance plate 85 and tubing feed block 100 as detailed in FIG. 11.

Figure 11:
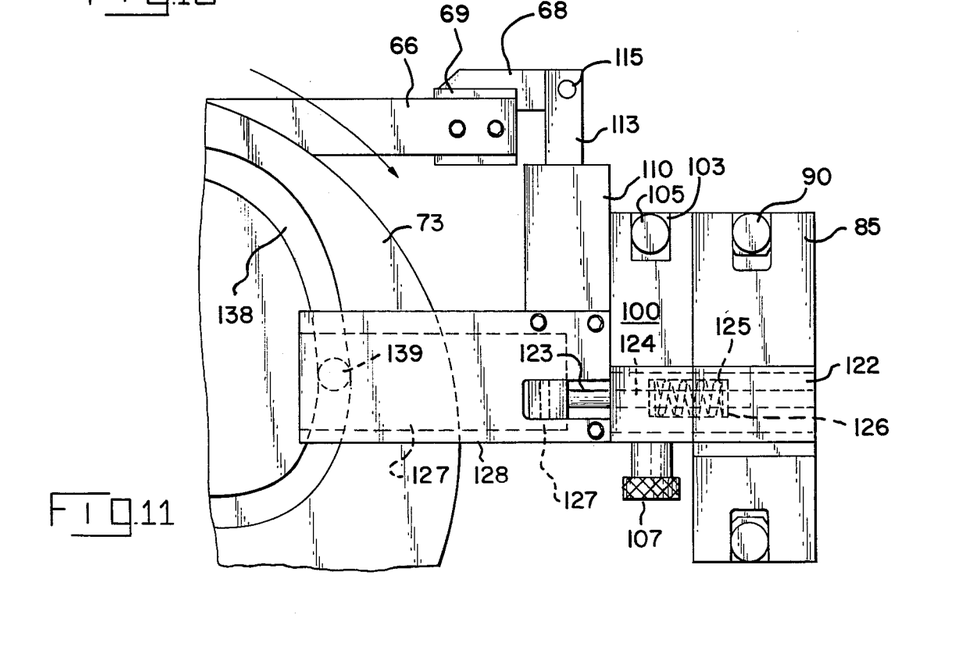
FIG. 11 is a section showing the tubing advance mechanism, taken along line 11—11 of FIG. 5.

FIG. 11 shows the forward portion of the advance cam 73 and the groove 138 which controls the tubing feed and advance mechanisms. Follower 139 is carried in advance slide 127 which has advance shaft 123 pinned in the opposite end (FIG. 8). The slide rides in a machined channel in the mount 110 and is retained therein by slide cover 128. The advance shaft 123 fits slideably through bore 124 in feed block 100 and is pinned in advance block 122 which is bolted to advance place 85 (FIG. 6). As slide 127 moves forward, plate 85 moves relative to both block 100 and mount 110 as spring 125 expands in counterbore 126 until the slide 127 bears against feed block 100 and moves it forward with the plate 85. Thus the forward motion of th jaw assembly commences before the feed clamp, and the feed clamp returns before jaw assembly.

Referring again to FIG. 5, lever mounting block 130 appears in plan. This piece serves to carry leveling slide 131 which carries upper jaw lever 74 and take up lever 78, and also pivotably carries stationary clamp lever 66 and lower jaw lever 82, as well as the feed tube clamp 135. These features appear to best advantage in FIG. 10.

The operational sequence of tubing applicator 10 will now be described in conjunction with elevation views 4A through 4D, cam groove plan views 13A through 13D, and timing diagram 14. FIG. 4A, previously described, shows the zero position. Here a section of tubing is held in the jaws and the feed clamp 102 grips the end of the continuous length of tubing. FIG. 4B shows the tubing advance plate 85 and feed block 100 fully forward as the cams are in the 100° position. The tubing section contained between jaws 86, 88 is positioned on the terminal at this time. FIG. 4C shows the advance plate 85 and feed block 100 still fully advanced as the cams are in the 180° position. Here the upper jaw lever 74' and lower jaw lever 82' are open, disengaging the jaws 86, 88 from the section of tubing which has been placed on the terminal and further disengaging the feed clamp 102 from the end of the tubing. Note that the stationary clamp 112 has descended as the feed clamp 102 arose so that control of the tubing position is continuous. FIG. 4D shows the advance plate 85 and feed block 100 returned as the cams are in the 270° position. Here the jaws 86, 88 are still open, but close shortly hereafter to shear another section of tubing and complete the cycle. Between 270° and 360° the conveyor moves the next lead into position for placing a tubing section on the terminal as the last lead advances toward the heater duct 34 (FIGS. 1, 2, and 3).

Figure 12:
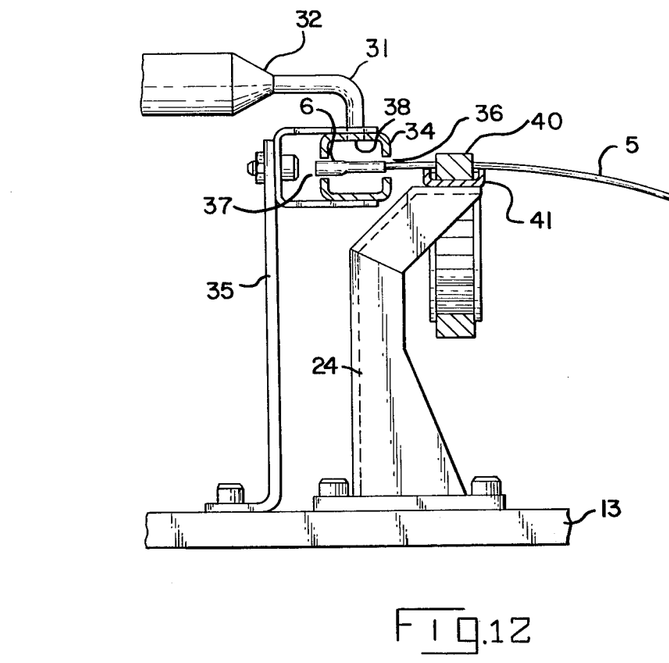
FIG. 12 is a section view of the heating apparatus, taken along line 12—12 of FIG. 4.
Figures 13A, 13B, 13C:
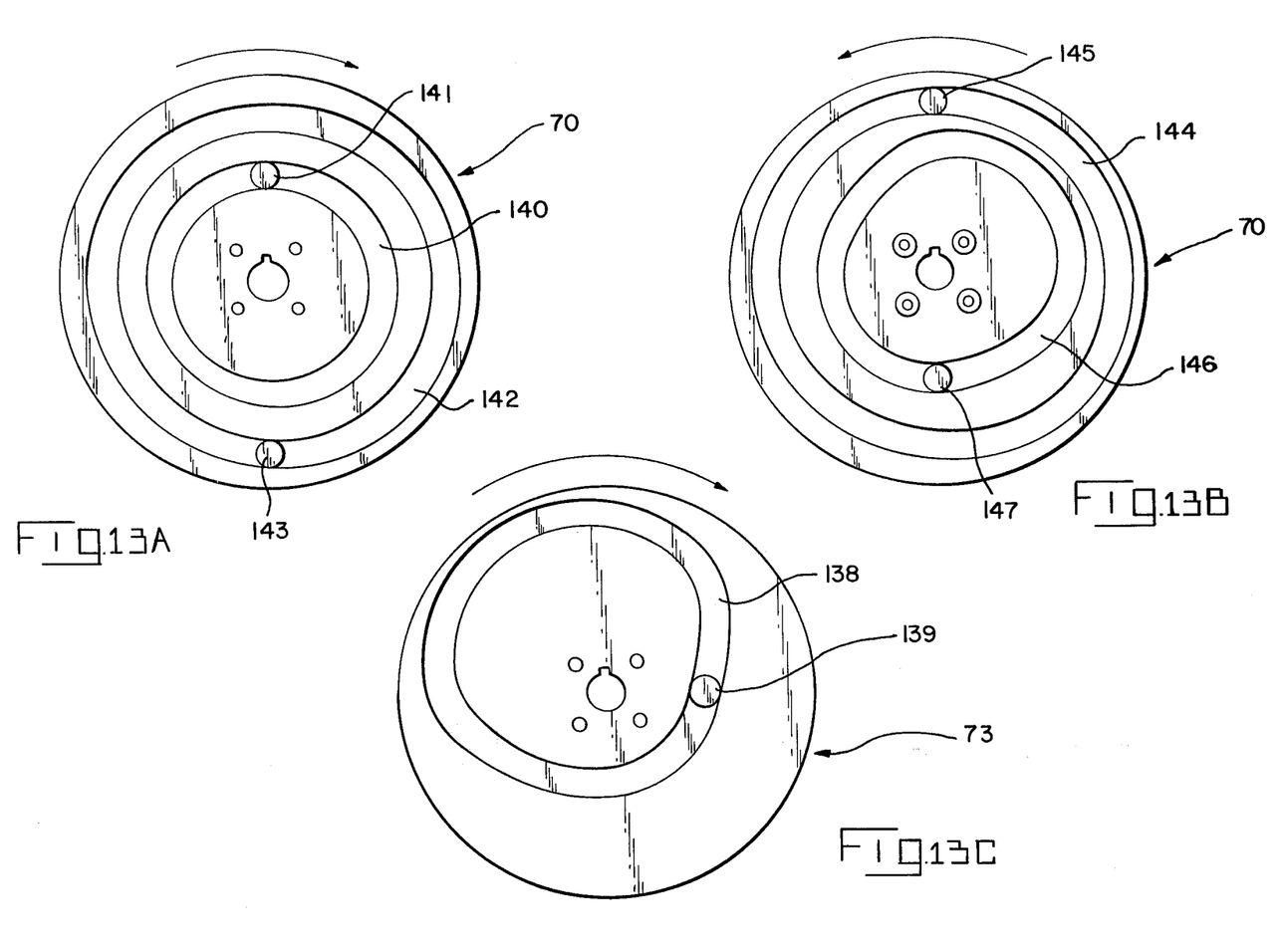
FIGS. 13A, 13B, 13C are plan views of the cam grooves.
Figure 14:
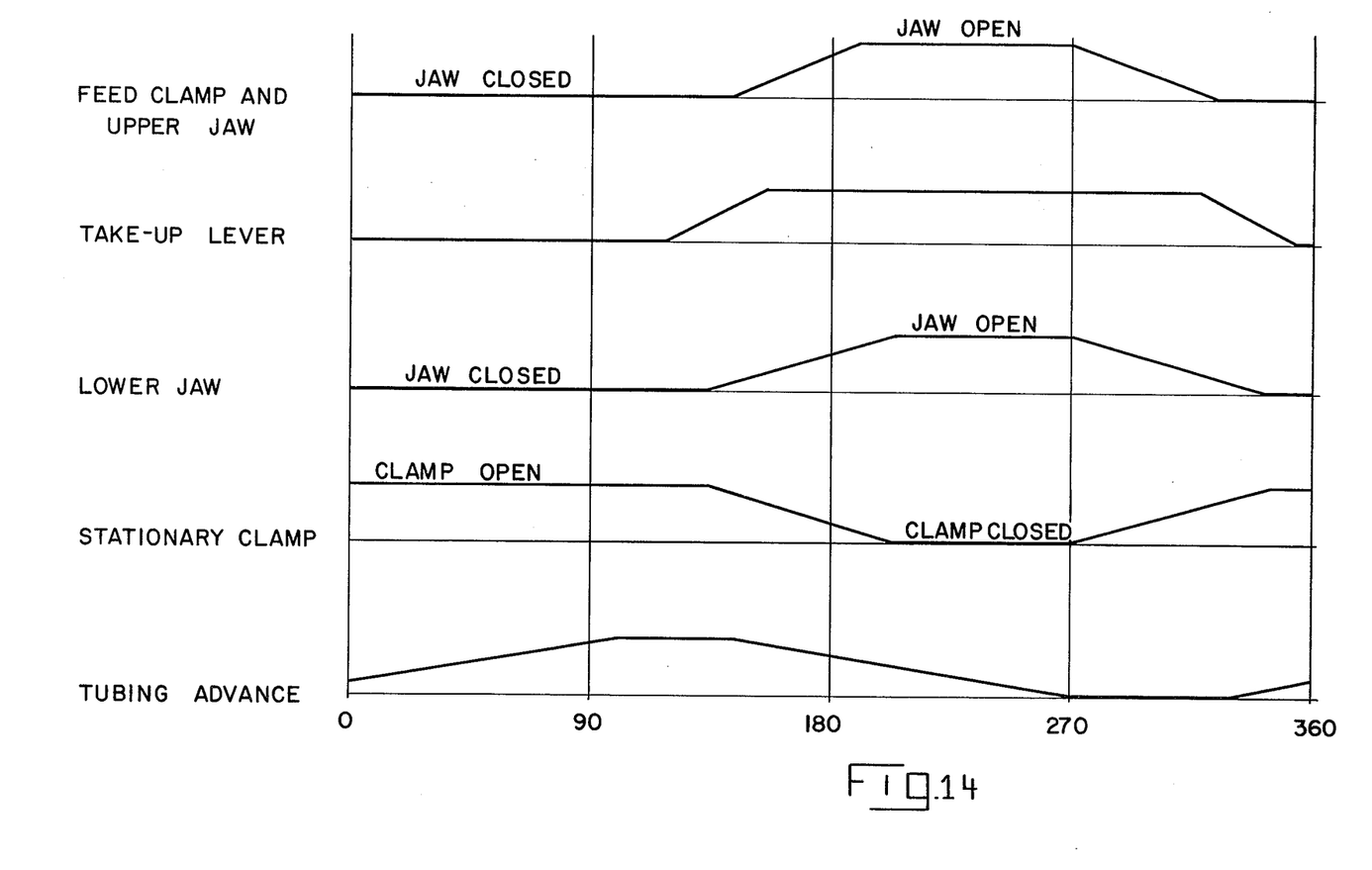
FIG. 14 is a timing diagram.

The heating duct 34 is shown in plan in FIG. 2, in elevation in FIG. 3, and cross sectionally in FIG. 12. Hot air is supplied to the duct 34 by a heater 32, a unit which heats air drawn from the rear of the heater and blows it into the duct 34 through a tube 31 to an aperture 38 in the top of the duct 34. The conveyor 40 passes parallel to the duct 34 and carries leads 5 so that each one extends into the first or front slot 36, and the tubing section 6 protrudes slightly beyond the second or rear slot 37. The slots 36, 37 each extend from the first end 58 of the duct (proximate to the tubing applicator) to the second end 59 of the duct (remote from the applicator) and lie in the plane of the upper run of the conveyor 40. Hot air thus passes into the duct 34 through the aperture 38 transversely of the slots 36, 37 and flows out the ends 58, 59 as the section of heat shrinkable tubing 6 passes therethrough, and the tubing 6 shrinks onto the terminal.

The fact that hot air enters the duct through a tube 31 to a single aperture 38 located about midway between the ends 58, 59 of the duct is critical to the function of the duct. Not even a proportionate amount of air escapes through slots 36, 37; the amount of hot air passing out the slots is inconsequential. This has a very important effect; the end 6f the section of tubing 6 which protrudes from rear slot 37 is not heated and thus does not shrink. Thus the section 6 may be placed on the terminal with an overlapping portion (e.g. about one sixteenth inch) which will not shrink around the end of the terminal, so that a safety overlap which precludes short circuiting but does not preclude mating with a mateable terminal is provided. Note that shrink tubing may shrink longitudinally as well as radially, and different types of tubing shrink different amounts. Thus, in addition to safety overlap, additional overlap should be provided to compensate for longitudinal shrinkage. Note also, that in addition to precluding shrinkage of tubing extending beyond the terminal, the lead may be positioned so that the terminated end extends beyond rear slot 37 of the duct. This prevents tubing from shrinking around the terminal itself, so that the spring action of the terminal is not affected. In another application of the heater, a sleeve could be shrink fitted onto a splice by having the spliced lead pass through both slots. Another important effect of this design is that the lack of hot air escaping through the front slot 36 protects the rubber conveyor 40 from heat damage. After the section of tubing is shrunk onto the terminal, the lead passes out of the second end of the duct and the wire receiving slot on the conveyor releases the lead as disclosed in U.S. Pat. No. 3,804,603.

The above description is directed to the preferred embodiment and is not intended to limit the scope of the claims which follow.

What is claimed is:

1. Apparatus for securing heat shrinkable tubing to the leading end of a wire comprises:
   a duct having an open first end and an open second end, said duct having a first linear slot extending between said first end and said second end, said duct further having an aperture between said ends,
   a hot air source positioned to provide hot air to said aperture into said duct,
   a tube between said hot air source and said aperture, said hot air passing from said source through said tube to said aperture transversely of said slot,
   conveyor means adjacent to said first linear slot, said conveyor means having gripping means for gripping said wire so that the leading end will extend axially into said duct through said first linear slot, said conveyor means moving from said first end toward said second end so that said wire is conveyed laterally of its axis, whereby,
   a wire having a piece of heat shrinkable tubing placed on the leading end can be gripped by said gripping means and conveyed by; said conveyor means with said leading end extending into said first linear slot and exposed to said hot air in said duct, thereby shrinking said heat shrinkable tubing onto said leading end.

2. The apparatus of claim 1 wherein said duct has a second linear slot extending between said ends, said second linear slot being opposite said first linear slot in the plane of the conveyed wires and the first linear slot, whereby, said leading end of said wire may have a section of shrink tubing positioned thereon and may be conveyed so that a portion of said shrink tubing will protrude from said second linear slot and not be exposed to heat in the duct.

3. The apparatus of claim 2 wherein said aperture is located midway between said ends and midway between said first slot and said second slot.

* * * * *